US011901777B2

(12) United States Patent
Yamagishi

(10) Patent No.: US 11,901,777 B2
(45) Date of Patent: Feb. 13, 2024

(54) WINDING DEVICE AND WIRE WINDING METHOD

(71) Applicant: NITTOKU Co., Ltd., Saitama (JP)

(72) Inventor: Naoki Yamagishi, Ohmura (JP)

(73) Assignee: NITTOKU CO., LTD., Saitama (JP)

( * ) Notice: Subject to any disclaimer, the term of this patent is extended or adjusted under 35 U.S.C. 154(b) by 384 days.

(21) Appl. No.: 17/440,098

(22) PCT Filed: Sep. 17, 2020

(86) PCT No.: PCT/JP2020/035201
§ 371 (c)(1),
(2) Date: Sep. 16, 2021

(87) PCT Pub. No.: WO2021/100303
PCT Pub. Date: May 27, 2021

(65) Prior Publication Data
US 2022/0190695 A1 Jun. 16, 2022

(30) Foreign Application Priority Data
Nov. 18, 2019 (JP) ................................. 2019-207760

(51) Int. Cl.
*B65H 75/14* (2006.01)
*H02K 15/04* (2006.01)
*B65H 54/28* (2006.01)

(52) U.S. Cl.
CPC ..... *H02K 15/0435* (2013.01); *B65H 54/2869* (2013.01); *B65H 75/14* (2013.01); *B65H 2701/36* (2013.01)

(58) Field of Classification Search
CPC ................ B65H 75/14; B65H 54/2869; B65H 2701/36; H02K 15/045; H02K 15/0435
See application file for complete search history.

(56) References Cited

U.S. PATENT DOCUMENTS

| 2,964,252 | A | * | 12/1960 | Rosenberg | ......... | B65H 54/2869 |
| | | | | | | 242/DIG. 1 |
| 5,174,013 | A | * | 12/1992 | Hiroshima | ........... | H02K 15/045 |
| | | | | | | 72/142 |
| 6,216,513 | B1 | * | 4/2001 | Nakamura | ............ | H01F 41/077 |
| | | | | | | 72/224 |
| 6,553,650 | B2 | * | 4/2003 | Nakamura | ............ | H01F 41/077 |
| | | | | | | 29/784 |

(Continued)

FOREIGN PATENT DOCUMENTS

CN       1689123 A     10/2005
JP     H11312621 A     11/1999

(Continued)

*Primary Examiner* — Sang K Kim
(74) *Attorney, Agent, or Firm* — Rabin & Berdo, P.C.

(57) ABSTRACT

A winding device includes: a winding core having a winding body and flanges provided on both sides of the winding body in a rotation-axis direction, the winding core being configured such that a wire rod supplied from a supply source is wound around the winding body being rotated; a guide member configured to be rotated together with the winding core, the guide member being configured to guide the wire rod to the winding body; and an axial-direction moving mechanism configured to move the guide member in the rotation-axis direction of the winding core.

9 Claims, 14 Drawing Sheets

(56) References Cited

U.S. PATENT DOCUMENTS

| | | | |
|---|---|---|---|
| 7,314,195 B2 * | 1/2008 | Takeda | H01F 41/082 242/445.1 |
| 2001/0015393 A1 | 8/2001 | Miyazaki | |
| 2005/0242227 A1 | 11/2005 | Takeda et al. | |

FOREIGN PATENT DOCUMENTS

| | | |
|---|---|---|
| JP | 2014110329 A | 6/2014 |
| JP | 2015-050364 A | 3/2015 |
| TW | 201545180 A | 12/2015 |

* cited by examiner

WINDING DEVICE AND WIRE WINDING METHOD

This application claims priority based on Japanese Patent Application No. 2019-207760 filed with the Japan Patent Office on Nov. 18, 2019, the entire contents of which are incorporated into this specification.

TECHNICAL FIELD

The present invention relates to a winding device and a wire winding method.

BACKGROUND ART

A coil formed by winding a wire rod is conventionally used in a dynamo-electric machine, such as an electric motor, a generator, and so forth, and it is a routine procedure to increase a number of windings of the wire rod in order to increase its outputs. However, if a number of windings of the wire rod is simply increased, then, an increase in size of the dynamo-electric machine would be caused as a result. Thus, a proportion of the total sum of the cross-sectional areas of the wire rod with respect to the cross-sectional area of a slot for accommodating a coil (hereinafter, referred to as "a fill factor") between magnetic poles in the dynamo-electric machine is generally increased.

In the above, "the fill factor is increased" means that gaps formed between the wire rod to be wound is reduced, and in order to achieve it, there has been proposed a winding device in which, in a vicinity of a rotating winding core, the wire rod is guided by using a nozzle provided separately from the winding core and the wire rod is wound around the winding core in the regular pattern (for example, see JP2015-50364A).

As described above, with a conventional device for regular winding, the regular winding has been achieved by guiding the wire rod to the vicinity of the rotating winding core by using the nozzle and by performing the winding by causing the nozzle to approach the winding core as close as possible.

SUMMARY OF INVENTION

As described above, with the conventional winding device, in a case in which the wire rod is guided by using the nozzle and the wire rod delivered therefrom is wound around the rotating winding core in a regular winding pattern, it is required to cause the nozzle to approach the winding core. However, in a case in which the winding core such as those provided with flanges on both sides of a winding body, on which the wire rod is actually wound, in the rotation-axis direction is used, as an end portion of the nozzle, from which the wire rod is delivered, approaches the flange side end portion of the winding body, there is a risk in that the nozzle itself comes into direct contact with the flanges.

Thus, when the winding core, in which the flanges are formed on both sides of the winding body, is used, because the wire rod is guided by placing the nozzle at the outer side of the flanges in the rotational radial direction so as not interfere with the rotating flanges, a gap equal to or greater than the height of the flanges is formed between the nozzle and the winding body.

In addition, with the winding core in which a cross section of the winding body forms a rectangle, because corner portions of the winding body are located farthest from the center of rotation, it is necessary to prevent the nozzle from coming into contact with the flanges provided on both sides of the winding body when the nozzle faces the corner portions of the winding body. As a result, a distance from the nozzle to flat planes between the corner portions of the winding body is further increased.

Thus, in a case in which the wire rod is wound around the winding core having the flanges formed on both sides of the winding body, even when the wire rod is guided by using the nozzle, the nozzle cannot be moved close to the winding body around which the wire rod is actually wound, and if the wire rod delivered from the nozzle is tilted, it becomes difficult to guide the wire rod to a desired location on the winding body of the winding core.

When it has become difficult to guide the wire rod to the desired location on the winding body, an irregularity gradually begins to build up as the winding layer of the wire rod wound around the winding core is increased, and it becomes difficult to achieve a so called regular winding in which the wire rod is wound in a closely packed manner. Especially, when the number of layers is equal to or greater than ten, it is extremely difficult to perform the regular winding on all of these layers.

An object of the present invention is to provide a winding device and a wire winding method capable of achieving regular winding by guiding a wire rod to a desired position on a winding body.

According to one aspect of the present invention, a winding device includes: a winding core having a winding body and flanges provided on both sides of the winding body in a rotation-axis direction, the winding core being configured such that a wire rod supplied from a supply source is wound around the winding body being rotated; a guide member configured to be rotated together with the winding core, the guide member being configured to guide the wire rod to the winding body; and an axial-direction moving mechanism configured to move the guide member in the rotation-axis direction of the winding core.

According to another aspect of the present invention, a wire winding method for winding a wire rod around a winding body by rotating a winding core in which flanges are provided on both sides of the winding body in a rotation-axis direction, the wire winding method includes: a step of rotating a guide member together with the winding core, the guide member being configured to guide the wire rod supplied from a supply source to the winding body, and a step of winding the wire rod guided by the guide member around the winding body.

DESCRIPTION OF EMBODIMENT

Next, an embodiment of the present invention will be described in a detail with reference to the drawings.

Figure 3:
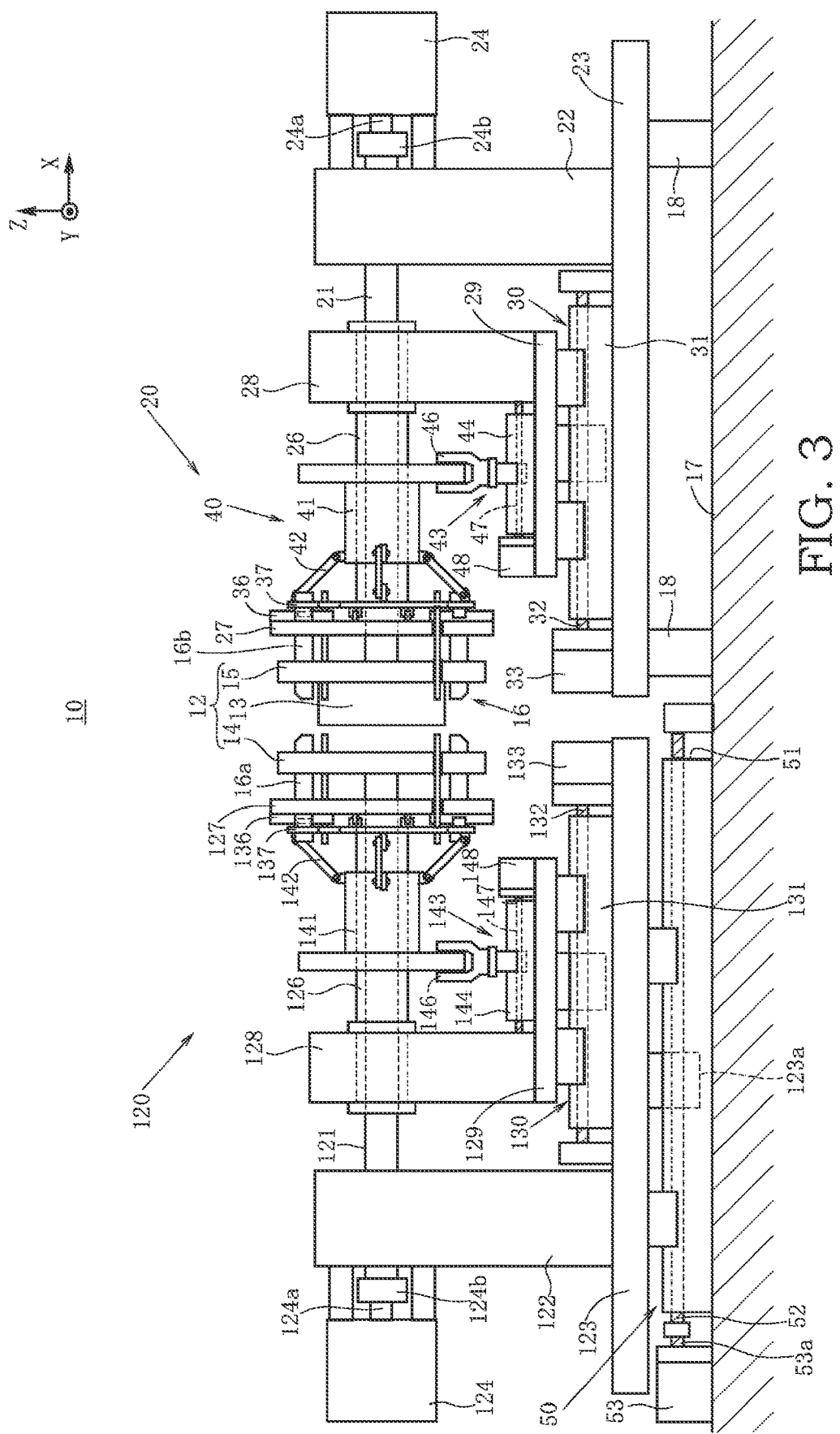
FIG. 3 is a front view showing a state at which a first flange is separated from a winding body by the winding device in the embodiment of the present invention, and is a diagram corresponding to FIG. 4.
Figure 4:
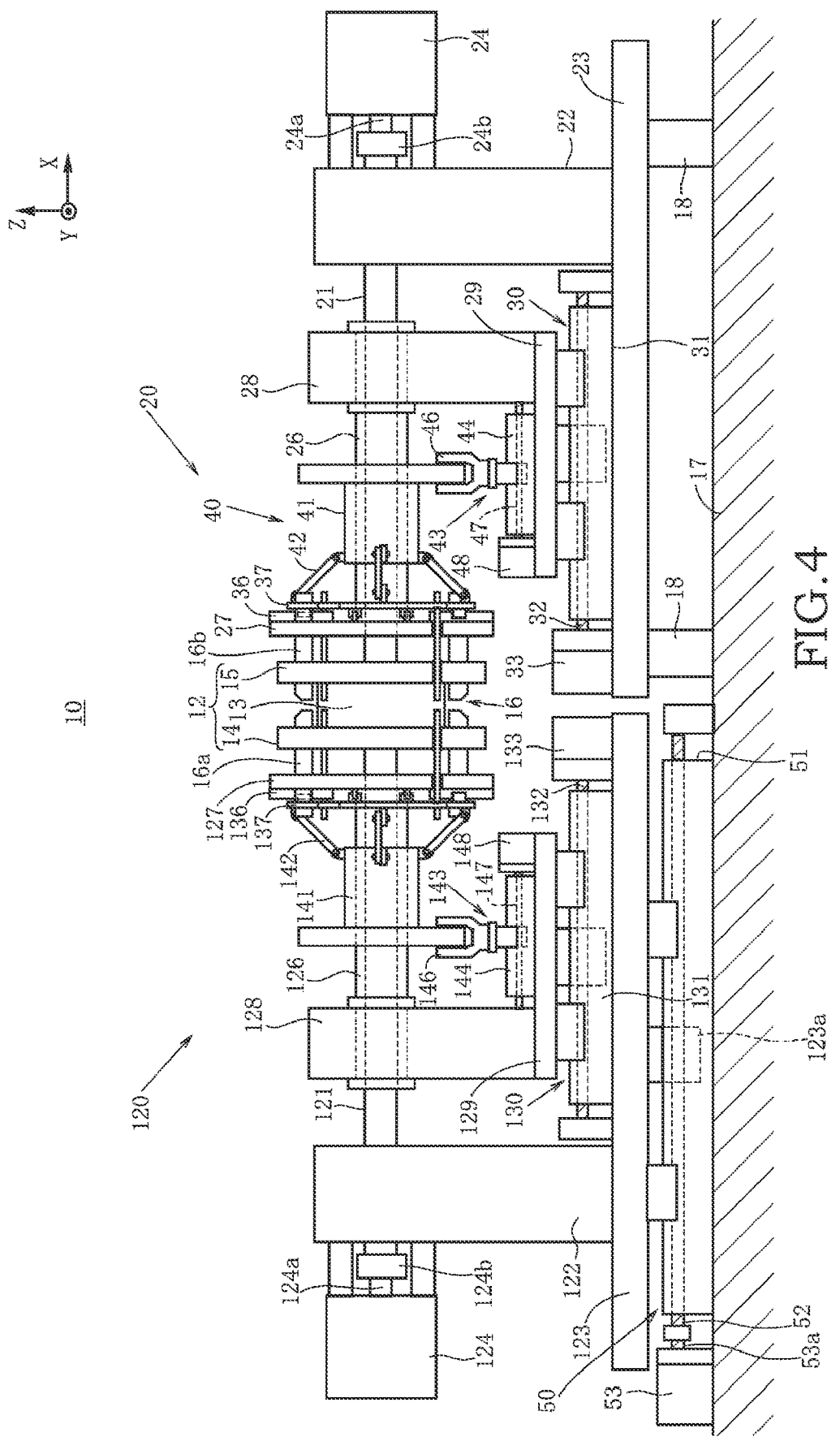
FIG. 4 is a front view of the winding device in the embodiment of the present invention.
Figure 5:
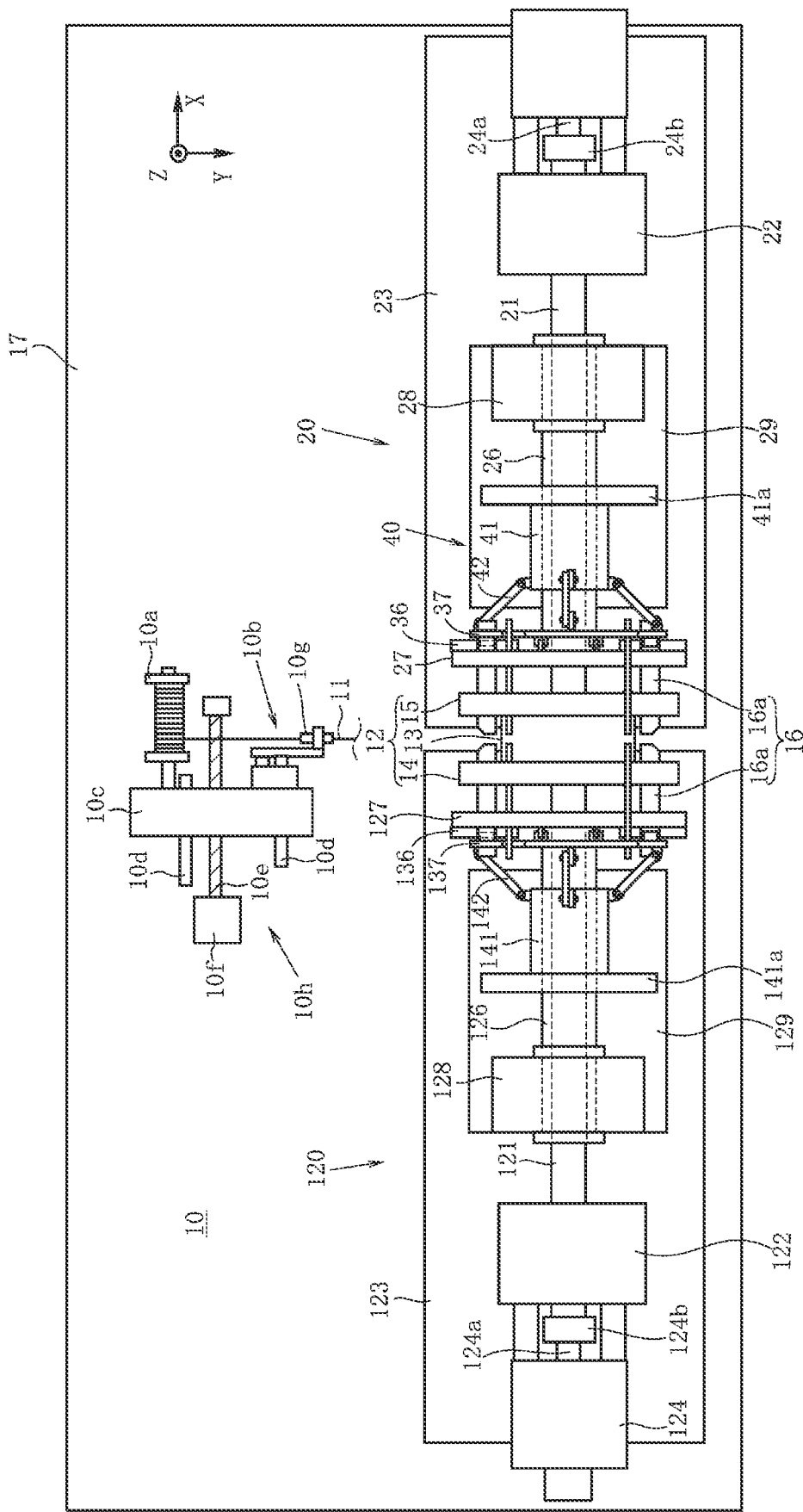
FIG. 5 is a top view of the winding device in the embodiment of the present invention.

FIGS. 3 to 5 show a winding device 10 in the embodiment of the present invention. In each of figures, a configuration of the winding device 10 will be described by setting mutually orthogonal three axes X, Y, and Z. Here, the X axis extends in the substantially horizontal transverse direction, the Y axis extends in the substantially horizontal front-rear direction, and the Z axis extends in the vertical direction.

The winding device 10 is the winding device 10 in which a wire rod 11 supplied from a drum 10a (see FIG. 5) serving as a supply source is wound around an winding body 13 between flanges 14 and 15 of a rotating winding core 12. Thus, the winding core 12 of the winding device 10 has the winding body 13 and the flanges 14 and 15 provided on both sides of the winding body 13. In other words, the winding device 10 has the winding core 12 having the winding body 13 and the flanges 14 and 15 provided on both sides of the winding body 13 in the rotation-axis direction, and the wire rod 11 supplied from the drum 10a is wound around the rotating winding body 13 of the winding core 12.

As shown in FIGS. 3 to 6, in the winding core 12 in this embodiment, the winding body 13 has a rectangular cross section, and the flanges 14 and 15 for limiting a winding width of the wire rod 11 on the winding body 13 are each formed to have a rectangular shape having an external shape that has the outer diameter larger than that of the shape of the winding body 13. As shown in FIG. 3, the first flange 14 is attached to the one end side of the winding body 13 in a detachable manner, and the second flange 15 is directly attached to the other end of the winding body 13.

Figure 10:
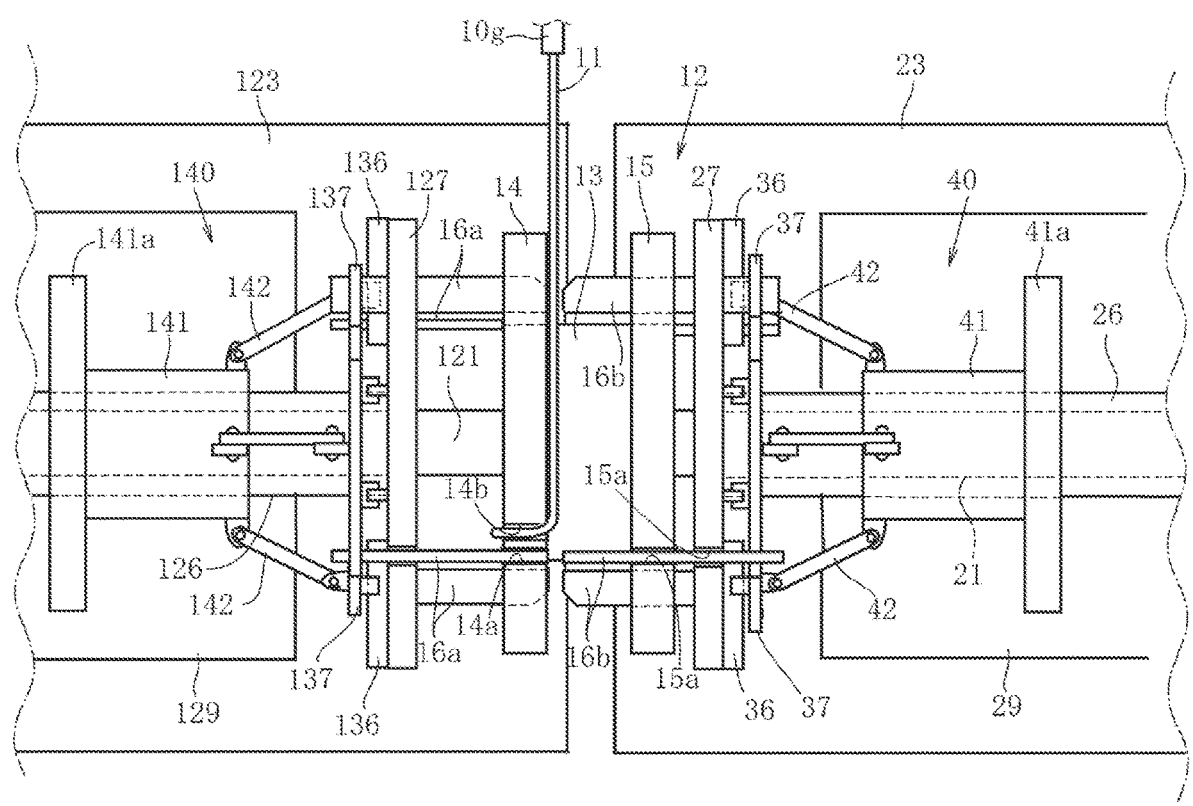
FIG. 10 is a top view showing the winding core at start of winding of the wire rod.

The winding device 10 is provided with a main support rotation mechanism 20 (a main support rotation means) that supports and rotates the winding body 13 together with the second flange 15 and a sub-support rotation mechanism 120 (a sub-support rotation means) that supports the first flange 14 coaxially with the winding body 13 and that rotates the first flange 14. The first flange 14 is formed with a latch part (not shown) with which the wire rod 11 is engaged at the start of the winding and a notch 14b for drawing the wire rod 11 held by the latch part to the winding body 13 (see FIG. 10).

Because the main support rotation mechanism 20 and the sub-support rotation mechanism 120 in this embodiment are configured to have a symmetrical configuration, the main support rotation mechanism 20 on the right half on FIG. 2 will be described as a representative.

In the winding core 12 in which the second flange 15 is attached to the other end side of the winding body 13, a rotation main shaft 21 is provided so as to extend coaxial with the center of the winding core 12 from the flange 15 side, and the rotation main shaft 21 extends in the horizontal transverse direction (the X axial direction) so as to be pivotably supported by a support column 22 at its tip end portion. The support column 22 is erected on a mount base 23, and a wire winding motor 24 that rotates the rotation main shaft 21 is attached to the support column 22 such that a rotation shaft 24a extends coaxially with the rotation main shaft 21.

The rotation shaft 24a of the wire winding motor 24 and the rotation main shaft 21 are linked by a coupling 24b, and they are configured such that as the wire winding motor 24 is driven and the rotation shaft 24a is rotated, the rotation main shaft 21 linked to the rotation shaft 24a is rotated. As the rotation main shaft 21 is rotated, the winding core 12, in other words, the winding body 13 and the second flange 15, provided on the rotation main shaft 21 is then rotated in this configuration.

In addition, the winding device 10 in this embodiment is provided with guide members 16 that are rotated together with the winding core 12 and guides the wire rod 11 supplied from the drum 10a to the winding body 13. In other words, the winding device 10 is provided with the guide members 16 that are rotated together with the winding core 12 and guides the wire rod 11 to the winding body 13. Specifically, a barrel body 26 is fit to the rotation main shaft 21 between the support column 22 and the flange 15. The barrel body 26 is fit such that, although the barrel body 26 is movable in the longitudinal direction thereof with respect to the rotation main shaft 21, the rotation of the barrel body 26 with respect to the rotation main shaft 21 is prohibited. A pivotably supporting plate 27 that is provided so as to be perpendicular to the rotation main shaft 21 and so as to oppose to the second flange 15 with a gap therebetween is attached to an end edge of the barrel body 26 on the flange 15 side, and the guide members 16 are provided on the pivotably supporting plate 27.

An end portion of the barrel body 26 on the support column 22 side is pivotably supported by a movable column 28. The movable column 28 is mounted on a movable base 29 that is provided on the mount base 23 so as to be movable in the X axial direction, and on the mount base 23, an axial-direction moving mechanism 30 (an axial-direction moving means) that moves the movable base 29 together with the barrel body 26, the pivotably supporting plate 27, and the guide members 16 in the rotation-axis direction of the winding core 12 is provided. In other words, the winding device 10 is provided with the axial-direction moving mechanisms 30 and 130 that move the guide members 16 in the rotation-axis direction of the winding core 12.

The axial-direction moving mechanism 30 in this embodiment has: a pair of guide rails 31 that are provided on the mount base 23 so as to extend in parallel with each other in the rotation-axis direction (the X axis direction) of the winding core 12; the movable base 29 that is provided on the pair of guide rails 31 so as to be movable in the rotation-axis direction of the winding core 12; a ball screw 32 that is provided on the mount base 23 and that extends in the X axis direction so as to penetrate through the center of the pair of guide rails 31; and a moving motor 33 that is linked to the ball screw 32 such that the ball screw 32 can be rotated.

The moving motor 33 in this embodiment is a servo motor capable of changing rotation speed of the ball screw 32, and the ball screw 32 is attached so as to be coaxial with the rotation axis of the moving motor 33. A female screw piece 29a with which the ball screw 32 is screwed is attached to the movable base 29.

Control output of a controller (not shown) is connected to the moving motor 33. As the moving motor 33 is driven and the ball screw 32 is rotated on the basis of the instruction from the controller, the movable base 29 to which the ball screw 32 is screwed via the female screw piece 29a is configured so as to be moved together with the barrel body 26, the pivotably supporting plate 27, and the guide members 16 in the rotation-axis direction (the X axis direction) of the winding core 12.

As shown in FIGS. 3 to 5, the main support rotation mechanism 20 and the sub-support rotation mechanism 120, and other structures that are respectively provided on the main support rotation mechanism 20 and the sub-support rotation mechanism 120 to support and move the guide members 16 are formed so as to be left-right symmetric. Members on the sub-support rotation mechanism 120 side that correspond to the members on the main support rotation mechanism 20 side are assigned reference signs obtained by adding one hundred to the reference signs referring to the members of the main support rotation mechanism 20.

The main support rotation mechanism 20 is attached to a base 17 via bosses 18, and the sub-support rotation mechanism 120 that forms the symmetrical configuration with the main support rotation mechanism 20 is attached to the base 17 via a flange approach and separation mechanism 50 (flange approach and separation means).

The flange approach and separation mechanism 50 in this embodiment has a configuration that is similar to that of the axial-direction moving mechanism 30 mentioned above, and has a pair of guide rails 51 that are provided on the base 17 so as to extend in parallel with each other in the rotation-axis direction (the X axis direction) of the winding core 12, a ball screw 52 that is provided so as to extend in the X axis direction so as to penetrate through the center of the pair of guide rails 51, and a separation motor 53 that is linked to the ball screw 52 such that the ball screw 52 can be rotated.

A mount base 123 in the sub-support rotation mechanism 120 is mounted on the pair of guide rails 51 so as to be movable. In addition, the ball screw 52 is coaxially attached to a rotation shaft 53a of the separation motor 53, and a female screw piece 123a that is screwed with the ball screw 52 is attached to the mount base 123 of the sub-support rotation mechanism 120.

In addition, the control output of the controller (not shown) is connected to the separation motor 53, and as the separation motor 53 is driven and the ball screw 52 is rotated on the basis of the instruction from the controller, the female screw piece 123a to which the ball screw 52 is screwed is configured so as to move together with the sub-support rotation mechanism 120 in the rotation-axis direction (the X axis direction) of the winding core 12.

When the sub-support rotation mechanism 120 is moved by the flange approach and separation mechanism 50 described as above, a distance between the first flange 14 and the winding body 13 supported by the sub-support rotation mechanism 120 is changed. As shown in FIG. 4, by causing the first flange 14 to come into contact with one end of the winding body 13, it becomes possible to wind the wire rod 11 around the winding body 13. In addition, as shown in FIG. 3, by separating the first flange 14 from the one end of the winding body 13, the wire rod 11 that has wound around the winding body 13 can then be attached to and detached from the winding body 13. In other words, the winding device 10 is further provided with the flange approach and separation mechanism 50 that moves the first flange 14, which is provided on the winding body 13 in a detachable manner, towards and away from the winding body 13.

As shown in FIG. 5, in the winding device 10 in this embodiment, the supply source is the drum 10a, and the wire rod 11 is stored by being wound around the drum 10a. The drum 10a is pivotably supported by a movable base 10c on which a tension device 10b that applies a predetermined tension to the wire rod 11 delivered from the drum 10a. Here, a reference sign 10g in FIG. 5 shows a nozzle 10g that is provided on the tension device 10b to allow the wire rod 11 delivered from the drum 10a to pass therethrough towards the winding core 12.

In addition, the winding device 10 is provided with a nozzle-moving mechanism 10h (nozzle moving means) that moves the nozzle 10g in the rotation-axis direction of the winding core 12. The nozzle-moving mechanism 10h has: rails 10d on which the movable base 10c is mounted and that are provided on the base 17 so as to be adjacent to the winding core 12 and so as to extend in parallel with the rotation axis of the winding core 12; a ball screw 10e that is provided in parallel with the rails 10d and that is screwed with the movable base 10c; and a motor 10f that rotates the ball screw 10e such that the movable base 10c is moved along the rails 10d.

Figure 1:
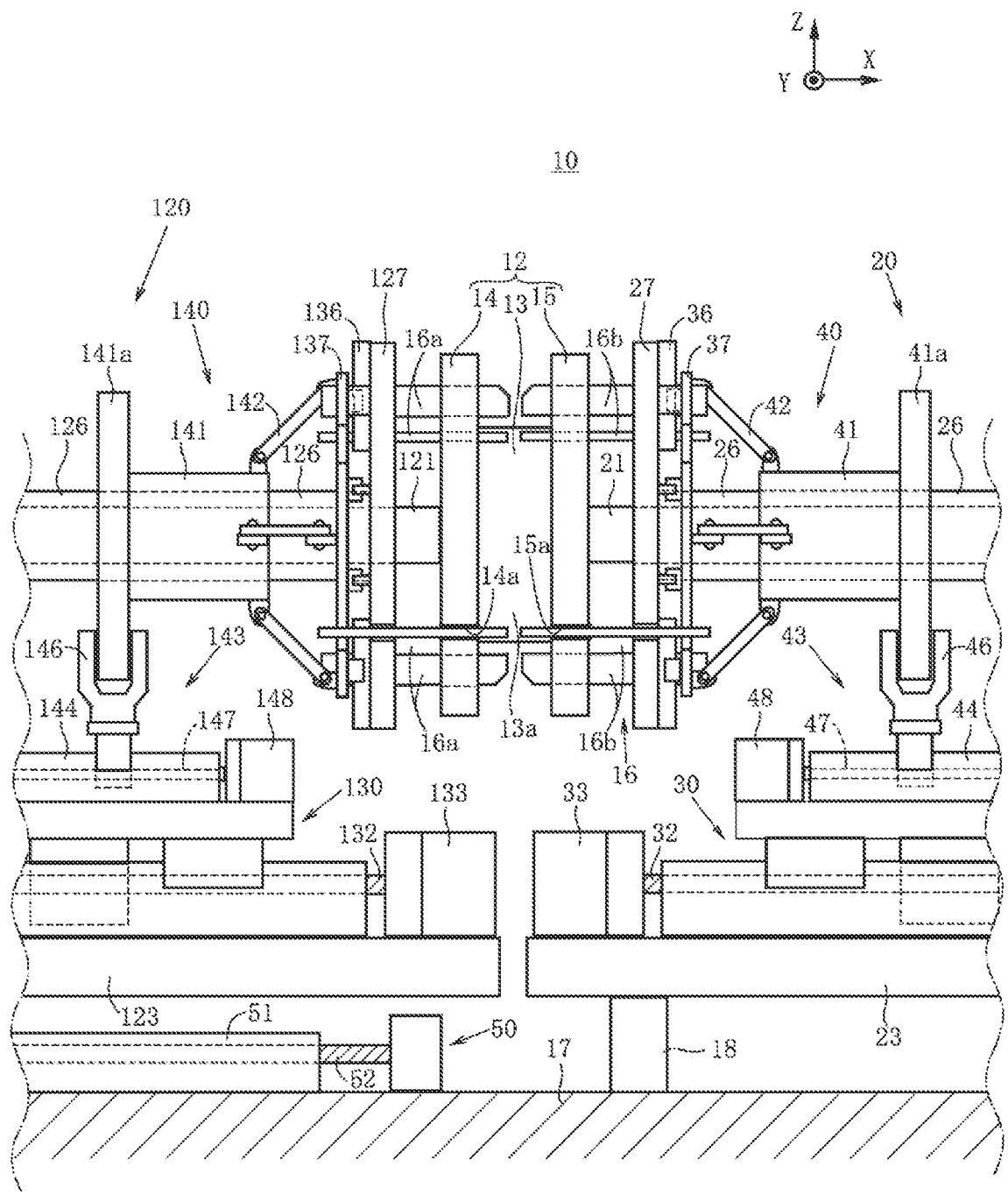
FIG. 1 is an enlarged view of surroundings of a winding core of a winding device in an embodiment of the present invention.

As shown in FIG. 1, the winding device 10 is provided with the guide members 16 that guide the wire rod 11 to the winding body 13. The guide members 16 in this embodiment each has a pair of guiding plates 16a and 16b that are provided in parallel with the rotation axis of the winding core 12 so as to respectively penetrates through the flanges 14 and 15 provided on both sides of the winding body 13, and either one of the guiding plates 16a and 16b is provided on a pivotably supporting plate 127 of the sub-support rotation mechanism 120 and the other is provided on the pivotably supporting plate 27 of the main support rotation mechanism 20. In addition, as described below, a gap S through which the wire rod 11 can pass is formed between opposing tip-end edges of the pair of guiding plates 16a and 16b. In other words, the guide members 16 each has the pair of guiding plates 16a and 16b that are provided in parallel with the rotation axis of the winding core 12 such that the respective tip-end edges thereof oppose to each other so as to form the gap S therebetween through which the wire rod 11 can pass.

Figure 6:
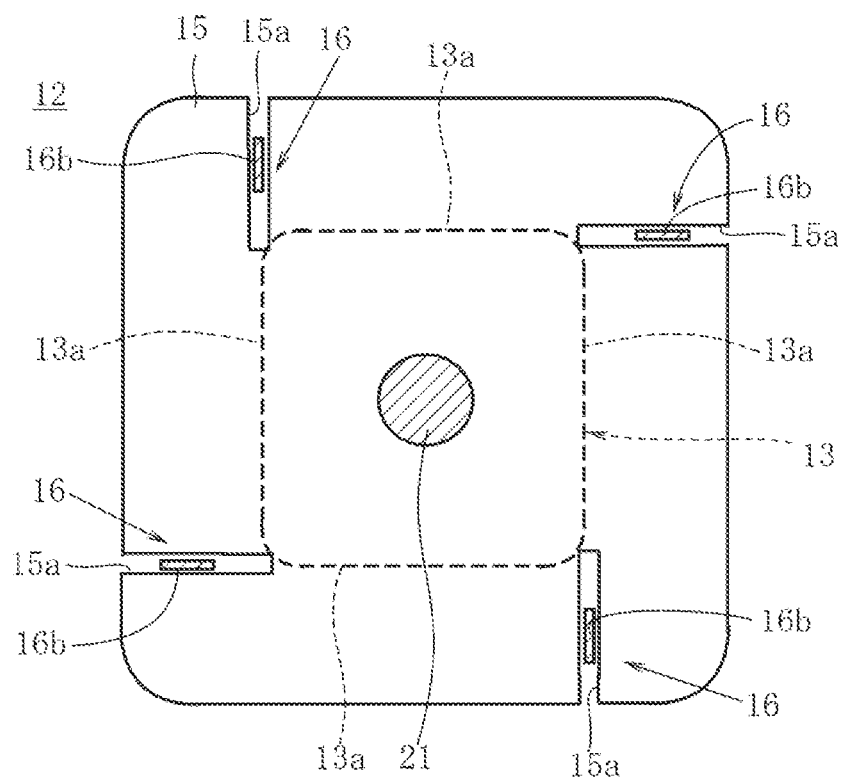
FIG. 6 is a sectional view taken along line A-A in FIG. 2 showing the winding core.

In this embodiment, as shown in FIG. 6, the winding core 12, in which the cross section of the winding body 13 has a rectangular shape having four surrounding flat face portions, is used. Thus, when the wire rod 11 is wound around the winding body, because the wire rod 11 covering the surrounding flat face portions extends linearly, the flat face portions form linear wound portions 13a at which the wire rod 11 extends linearly. The guide members 16 are provided so as to respectively face the four linear wound portions 13a. The guide members 16 are each provided at a winding-start part of the linear wound portion 13a (see FIG. 8). In other words, a plurality of linear wound portions 13a at which the wire rod 11 being wound around the winding body 13 extends linearly are formed in the winding core 12, and the guide members 16 are respectively provided for the plurality of linear wound portions 13a so as to face therewith.

In other words, as shown in FIGS. 1, 2, 6, 8, and 9, slits 14a and 15a, through which the guiding plates 16a and 16b respectively pass, are respectively formed in the flanges 14 and 15, which are provided on both sides of the winding body 13, at positions facing the winding-start parts of the linear wound portions 13a in a corresponding manner. The guiding plates 16a and 16b are provided by being inserted into the slits 14a and 15a, respectively, so as to extend in parallel with the rotation axis.

The guiding plates 16a and 16b shown in FIG. 1 are provided so as to extend in parallel with the rotation axis of the winding core 12 by being inserted into the slits 14a and 15a to pass through the flanges 14 and 15, respectively. In addition, as shown in FIG. 1, base ends of the guiding plates 16a and 16b inserted into the slits 14a and 15a are respectively attached to the pivotably supporting plates 27 and 127 of the main support rotation mechanism 20 and the sub-support rotation mechanism 120.

Figure 7:
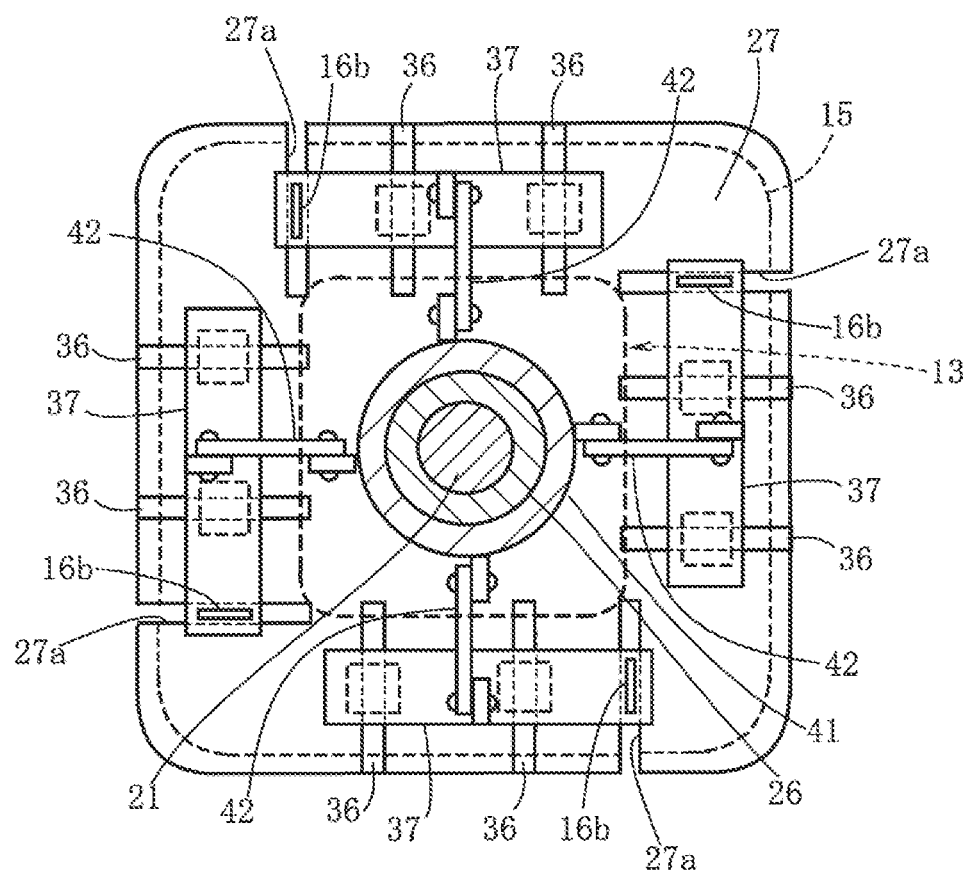
FIG. 7 is a sectional view taken along line B-B in FIG. 2 showing a radial-direction moving mechanism.

In this embodiment, the guiding plates 16a and 16b are respectively provided on the pivotably supporting plates 27 and 127, respectively, so as to be movable in the rotational radial direction of the winding core 12. The guiding plates 16b that are provided on the pivotably supporting plate 27 of the main support rotation mechanism 20 and that pass through the second flange 15 fixed to the winding body 13 will be described as a representative. As shown in FIGS. 2 and 7, rails 36 extending in the radial direction so as to be in parallel with the slits 15a in the flange 15 are attached to the pivotably supporting plate 27 on which the guiding plates 16b are provided. In addition, movable plates 37 are mounted on the rails 36 so as to be reciprocatably movable.

The pivotably supporting plate 27 are formed with slits 27a that respectively oppose to the slits 15a in the flange 15. The base ends of the guiding plates 16b that have been inserted into the slits 15a in the flange 15 and that have further passed through the slits 27a in the pivotably supporting plate 27 are respectively attached to the movable plates 37. The main support rotation mechanism 20 has a radial-direction moving mechanism 40 (radial-direction moving means) that moves the guiding plates 16b in the rotational radial direction of the pivotably supporting plate 27. In other words, the winding device 10 is further provided with the radial-direction moving mechanisms 40 and 140 that move the guide members 16 in the radial direction of the winding core 12.

Figure 2:
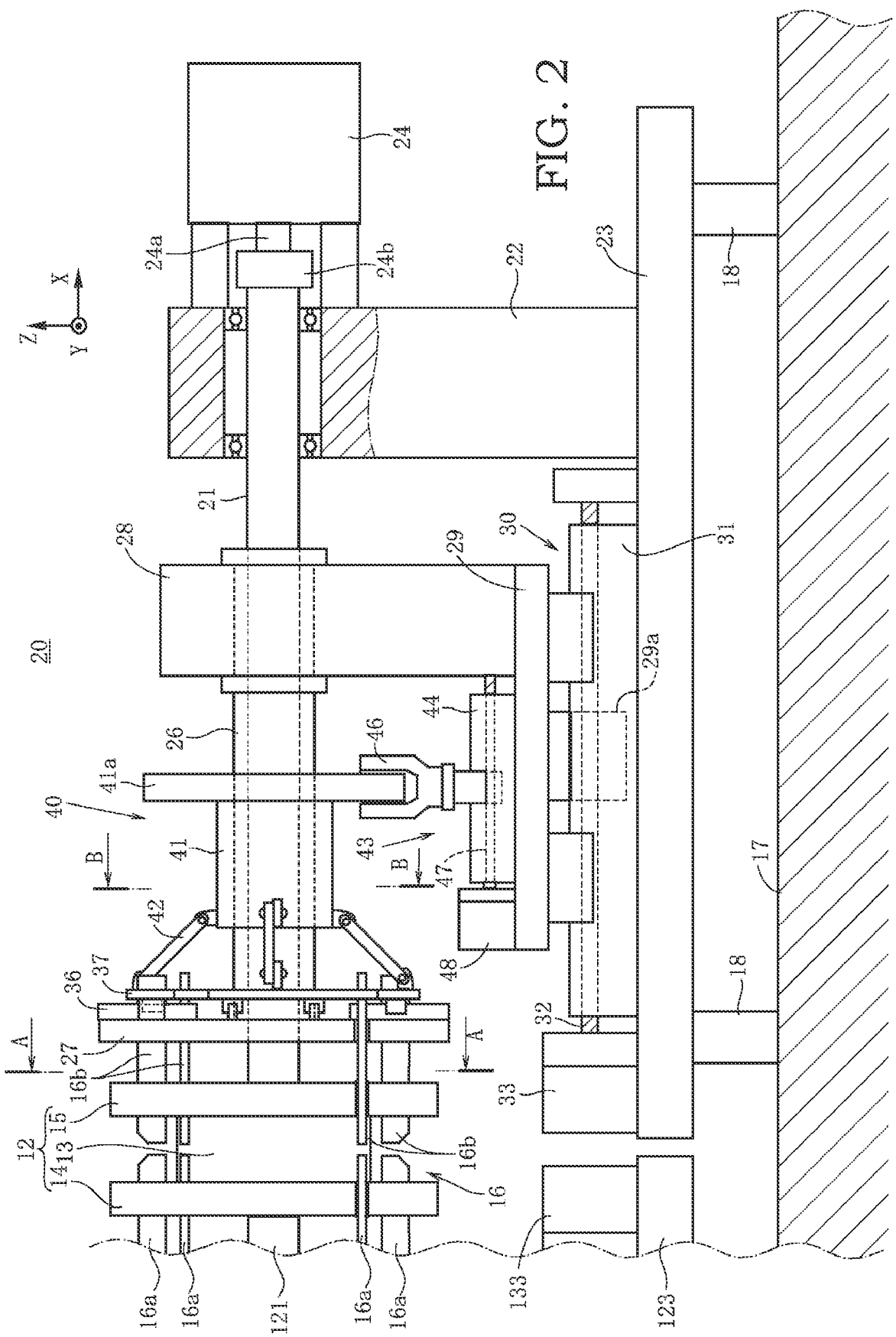
FIG. 2 is an enlarged view of a main support rotation mechanism of the winding device in the embodiment of the present invention.

As shown in FIG. 2, the radial-direction moving mechanism 40 in this embodiment has: an outer tube 41 that is fit to the barrel body 26 so as to be movable in the longitudinal direction of the barrel body 26, on the end portion of which the pivotably supporting plate 27 is provided, and so as not to be rotatable relative to the barrel body 26; linking pieces 42 that link the outer tube 41 and the movable plates 37; and a tube-moving mechanism 43 (tube moving means) that moves the outer tube 41 in the longitudinal direction of the rotation main shaft 21.

The tube-moving mechanism 43 has a configuration that is similar to that of the axial-direction moving mechanism 30 described above. The tube-moving mechanism 43 in this embodiment has: a pair of guide rails 44 that are provided on the movable base 29 so as to extend in parallel with each other in the rotation-axis direction (the X axis direction) of the winding core 12; an engaging piece 46 that is provided on the pair of guide rails 44 so as to be movable in the rotation-axis direction of the barrel body 26; a ball screw 47 that is provided on the movable base 29 by extending in the X axis direction so as to penetrate through the center of the pair of guide rails 44 (see FIGS. 1 and 4); and a tube-moving motor 48 that is linked to the ball screw 47 so as to be able to rotate the ball screw 47.

The tube-moving motor 48 in this embodiment is the servo motor capable of changing rotation speed of the ball screw 47. The ball screw 47 is coaxially attached to a rotation shaft of tube-moving motor 48, and the engaging piece 46 is screwed with the ball screw 47. The outer tube 41 is formed with a circular flange 41a that is enlarged in the radial direction, and the engaging piece 46 is configured to clamp the flange 41a in the axial direction of the outer tube 41, thereby allowing the rotation of the outer tube 41, but prohibiting the movement of the outer tube 41 in the axial direction independent from the engaging piece 46.

In addition, the control output of the controller (not shown) is connected to the tube-moving motor 48. It is configured such that as the tube-moving motor 48 is driven and the ball screw 47 is rotated on the basis of the instruction from the controller, the engaging piece 46 that is screwed with the ball screw 47 is moved together with the outer tube 41 in the rotation-axis direction of the barrel body 26 (the X axis direction).

As the outer tube 41 is moved by the tube-moving mechanism 43 as described above, a distance between the outer tube 41 and the pivotably supporting plate 27 is changed, the movable plates 37 that are provided on the pivotably supporting plate 27 so as to be movable and that are linked with the outer tube 41 via the linking pieces 42 are moved together with the guiding plates 16b in the rotational radial direction of the pivotably supporting plate 27.

In other words, the radial-direction moving mechanism 40 having the tube-moving mechanism 43 described above is configured such that, as the outer tube 41 is moved by the tube-moving mechanism 43, the plurality of movable plates 37 provided on the pivotably supporting plate 27 are moved at the same time in the radial direction, and then, all of the guiding plates 16b that are respectively attached to the plurality of movable plates 37 at their base ends are moved at the same time, and thereby, distances from an outer surface of the winding body 13 of the winding core 12 to the guiding plates 16b can be changed.

In the above, the configuration in which the guiding plates 16a are provided on the pivotably supporting plate 127 in the sub-support rotation mechanism 120 is symmetrical with the configuration in which the guiding plates 16b are provided on the pivotably supporting plate 27 in the main support rotation mechanism 20, and a repetitive description thereof is omitted. The members of the sub-support rotation mechanism 120 corresponding to those of the main support rotation mechanism 20 are assigned reference signs obtained by adding one hundred to the reference signs referring to the members of the main support rotation mechanism 20.

The controller (not shown) controls the respective radial-direction moving mechanisms 40 and 140 of the main support rotation mechanism 20 and the sub-support rotation mechanism 120 in a synchronous manner, thereby performing a control such that the tip-end edges of the pairs of guiding plates 16a and 16b are always opposed to each other by being located at the same distance from the outer surface of the winding body 13 of the winding core 12.

Furthermore, the controller (not shown) controls the respective axial-direction moving mechanisms 30 and 130 of the main support rotation mechanism 20 and the sub-support rotation mechanism 120, thereby performing a positional adjustment by moving the pivotably supporting plates 27 and 127 and the guide members 16 in the rotation-axis direction (the X axis direction) of the winding core 12. With such a configuration, the gaps S between the opposing tip-end edges of the respective pairs of guiding plates 16a and 16b (see FIG. 9) are adjusted such that the gaps S are each formed so as to allow the wire rod 11 to pass through between the tip-end edges. In other words, the axial-direction moving mechanisms 30 and 130 are configured so as to be able to change the gaps S between the pairs of guiding plates 16a and 16b.

In addition, the controller (not shown) controls the respective wire winding motors 24 and 124 of the main support rotation mechanism 20 and the sub-support rotation mechanism 120 in a synchronous manner, thereby rotating the winding core 12 that is provided on the rotation main shafts 21 and 121, in other words, integrally rotating the winding core 12 formed of the winding body 13 provided with the flanges 14 and 15 on both sides. The controller then performs the control such that the wire rod 11 supplied from the drum 10a is wound around the winding body 13 between the flanges 14 and 15.

Figure 8:
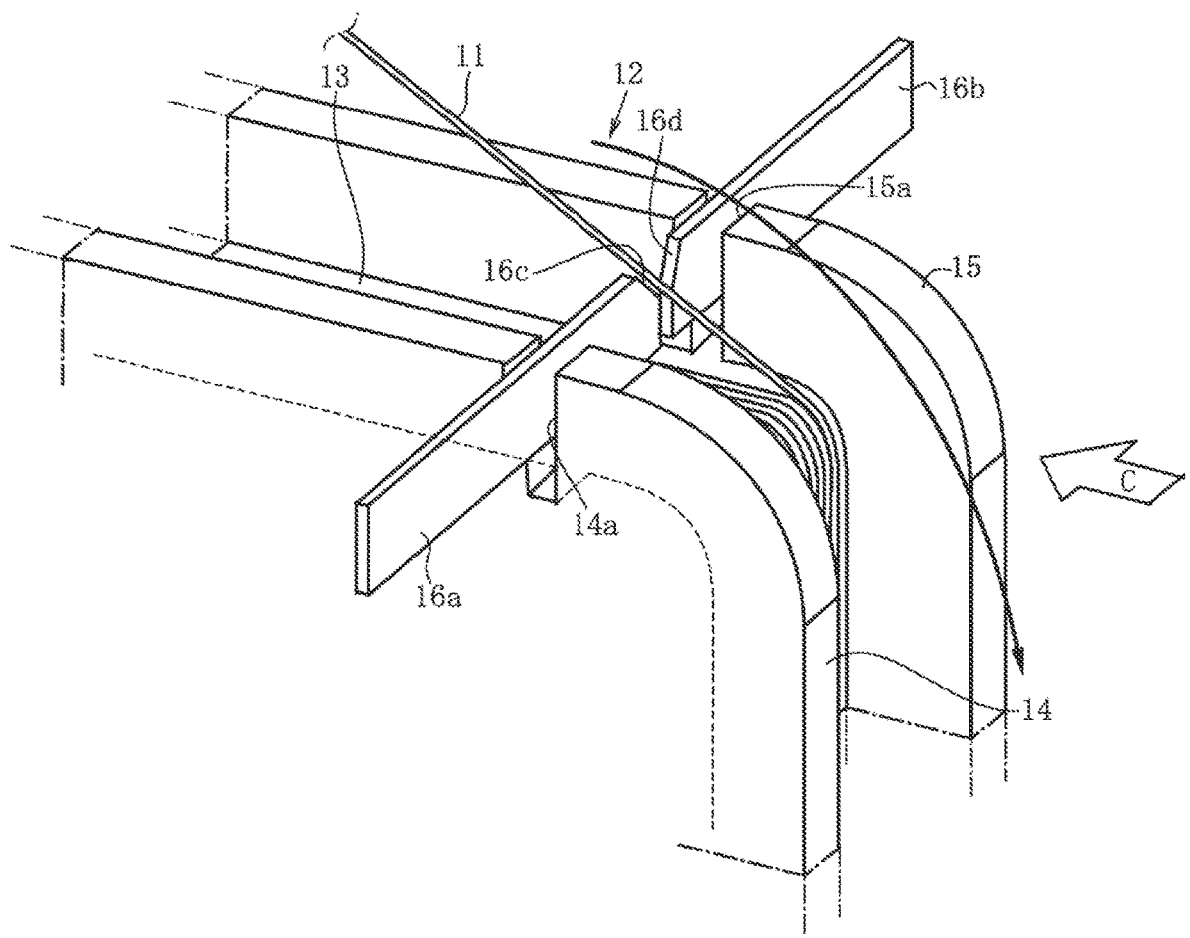
FIG. 8 is a perspective view showing a state at which a wire rod is guided by a guide member to the winding body.

Upon winding the wire rod 11, as shown in FIG. 8, the guide members 16 that are rotated together with the winding core 12 guide the wire rod 11 to the winding body 13. In this embodiment in which the guide members 16 each has the pair of guiding plates 16a and 16b, as shown in FIGS. 8 and 9, the opposing tip-end edges of the pair of guiding plates 16a and 16b are formed with inclined edges 16c and 16d, respectively, such that the gap between the opposing tip-end edges is increased with increasing distance from the winding body 13 in the winding core 12.

Figure 9:
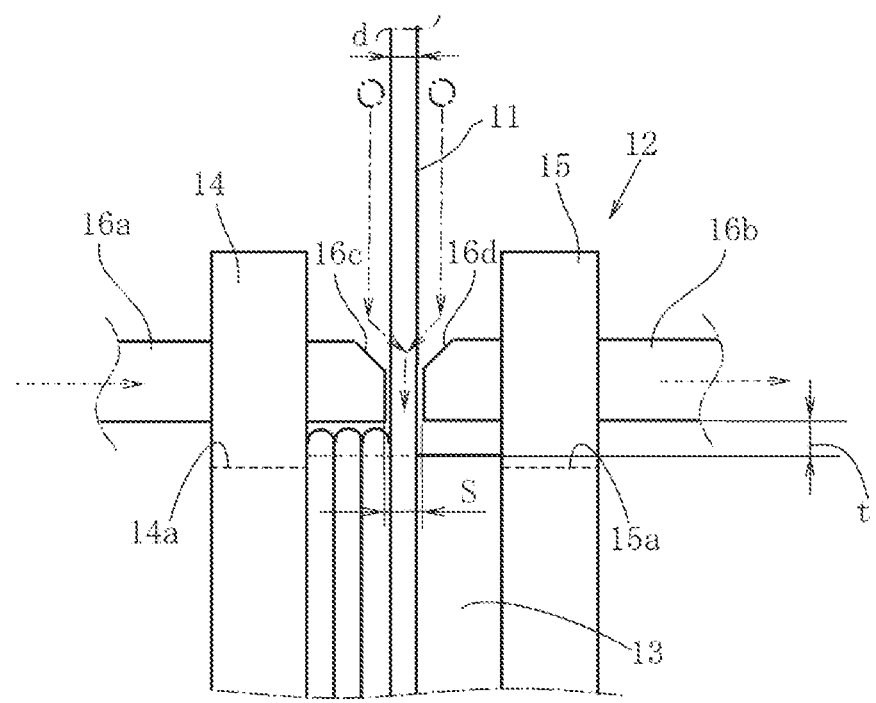
FIG. 9 is a diagram viewed from the direction of an arrow C in FIG. 8.

As shown by one-dot chain lines in FIG. 9, by providing the inclined edges 16c and 16d, the pair of guiding plates 16a and 16b are configured such that the wire rod 11 running towards the gap S between the opposing tip-end edges, through which the wire rod 11 can pass, from the direction deviated from the gap S comes into contact with the inclined edges 16c and 16d, and thereby, the wire rod 11 is guided by the inclined angle towards the gap S, through which the wire rod 11 can pass, as shown by the one-dot chain line arrows.

The controller (not shown) performs the positional adjustment by controlling the respective axial-direction moving mechanisms 30 and 130 in the main support rotation mechanism 20 and the sub-support rotation mechanism 120 such that the pivotably supporting plates 27 and 127 and the guide members 16 are moved in the rotation-axis direction (the X axis direction) of the winding core 12. By doing so, in this configuration, while maintaining the gap S, through which the wire rod 11 can pass, formed between the opposing tip-end edges of the pair of guiding plates 16a and 16b, the pair of guiding plates 16a and 16b are moved in the rotation-axis direction of the winding core 12 at the same speed with each other. In other words, the axial-direction moving mechanisms 30 and 130 are configured such that, while maintaining the gap S between the pair of guiding plates 16a and 16b, the pair of guiding plates 16a and 16b are moved in the rotation-axis direction of the winding core 12 at the same speed with each other.

Next, a wire winding method of the present invention using thus configured winding device will be described.

The wire winding method of this embodiment is the wire winding method in which, by rotating the winding core 12 in which the flanges 14 and 15 are provided on both sides of the winding body 13 in the rotation-axis direction, the wire rod 11 supplied from the drum 10a serving as the supply source is wound around the winding body 13 between the flanges 14 and 15 of the rotating winding core 12. In other words, the wire winding method of this embodiment is the wire winding method including a step of rotating the winding core 12 in which the flanges 14 and 15 are provided on both sides of the winding body 13 in the rotation-axis direction, and a step of winding the wire rod 11 around the winding body 13.

Because the above-described winding device 10 is used, the winding core 12, in which the first flange 14 is attached to the one end side of the winding body 13 in a detachable manner, and the second flange 15 is directly attached to the other end of the winding body 13, is used. In addition, the winding body 13 is supported together with the second flange 15 by the main support rotation mechanism 20, and the first flange 14 is supported by the sub-support rotation mechanism 120 so as to be coaxial with the winding body 13. As shown in FIG. 4, the winding is performed in a state in which the first flange 14 is brought into contact with the one end of the winding body 13.

On the other hand, because the above-described winding device 10 is used, as shown in FIG. 5, the wire rod 11 is prepared in a state being wound around the drum 10a, the wire rod 11 is drawn out from the drum 10a and is inserted into the nozzle 10g of the tension device 10b in advance. Then, the wire rod 11 that has been inserted into the nozzle 10g is engaged to the latch part (not shown) of the first flange 14 in FIG. 10, and the wire rod 11 hooked to the latch part is drawn into the winding body 13 from the notch 14b. At this time, in the nozzle-moving mechanism 10h (see FIG. 5), the nozzle 10 g is preferably be moved to a position at which the wire rod 11 that has been drawn into the winding body 13 extends beside the first flange 14.

Subsequently, the wire winding is performed by rotating the winding core 12. As shown in FIGS. 4 and 5, the rotation of the winding core 12 is performed by controlling the respective wire winding motor 24 and 124 of the main support rotation mechanism 20 and the sub-support rotation mechanism 120 in a synchronous manner. The wire rod 11 that is supplied from the drum 10a via the nozzle 10 g is wound around the winding body 13 of the rotating winding core 12 between the flanges 14 and 15.

Characteristic features of the wire winding method of this embodiment are that, at the timing of this wire winding, the guide members 16 that guide the wire rod 11 supplied from the drum 10a to the winding body 13 are rotated together with the winding core 12, and the wire rod 11 guided by the guide members 16 is wound around the winding body 13.

In the above-described winding device 10, the barrel body 26 and 126 are fit to the rotation main shafts 21 and 121 to which the winding core 12 is attached so as not be rotatable relative to the rotation main shafts 21 and 121, and the guide members 16 are provided on the pivotably supporting plates 27 and 127 that are integrally provided on the barrel body 26 and 126. Therefore, by rotating the rotation main shafts 21 and 121 together with the winding core 12 by driving the wire winding motor 24 and 124, the guide members 16 are rotated together with the winding core 12, at the same time.

The guide members 16 guide the wire rod 11 supplied from the drum 10a to a desired position on the winding body 13 in the rotation-axis direction. Upon performing the wire winding, the controller (not shown) of the above-described winding device 10 controls the respective axial-direction moving mechanisms 30 and 130 of the main support rotation mechanism 20 and the sub-support rotation mechanism 120 such that the gaps S, through which the wire rod 11 can pass (see FIG. 9), are formed between the opposing tip-end edges of the pairs of guiding plates 16a and 16b. By allowing the wire rod 11 to pass through the gap S, the wire rod 11 is guided to the desired position on the winding body 13.

Then, by controlling the respective radial-direction moving mechanisms 40 and 140 of the main support rotation mechanism 20 and the sub-support rotation mechanism 120 in a synchronous manner, the pairs of guiding plates 16a and 16b are moved closer to the outer surface of the winding body 13 of the winding core 12. Specifically, as shown in FIG. 9, it is preferable that distances t from the outer surface of the winding body 13 to the pairs of guiding plates 16a and 16b be set so as to be slightly larger than an outer diameter d of the wire rod 11.

In this embodiment, although a coil is formed by using the winding core 12 in which the cross section of the winding body 13 has a rectangular shape, because the guide members 16 are rotated together with the winding core 12, even if the winding core 12 is rotated, the relative positional relationship between the guide members 16 and the winding core 12 is not changed. Therefore, the guide members 16 do not interfere with the winding body 13 of the winding core 12. Thus, it becomes possible to move the guide members 16 sufficiently close to the corner portions and even to the flat linear wound portions 13a between the corner portions of the outer circumference of the winding body 13.

As described above, in a state in which the guide members 16 are moved close to the winding body 13, as shown in FIG. 8, the guide members 16 are rotated together with the winding core 12, and the wire rod 11 that has been supplied from the drum 10a (see FIG. 5) and that has passed between the opposing tip-end edges of the pairs of guiding plates 16a and 16b is wound around the winding body 13 between the flanges 14 and 15 of the rotating winding core 12.

Then, as shown in FIG. 9, the wire rod 11 that has passed between the opposing tip-end edges of the pairs of guiding plates 16a and 16b reaches the winding body 13 immediately, and therefore, it is possible to guide the wire rod 11 to the desired position reliably.

In this embodiment, as shown in FIG. 9, the inclined edges 16c and 16d are formed on the opposing tip-end edge of the pairs of guiding plates 16a and 16b, respectively. Therefore, even if the wire rod 11 runs towards the gap S between the opposing tip-end edges of the pair of guiding plates 16a and 16b from the direction deviated in the axial direction of the winding body 13, the wire rod 11 moves towards the gap S by coming into contact with the inclined edges 16c and 16d, and then, the wire rod 11 is guided from the gap S to the desired position on the winding body 13.

While maintaining the gap S between the tip-end edges of the pair of guiding plates 16a and 16b, as shown by broken line arrows in FIG. 9, the pair of guiding plates 16a and 16b are moved in the rotation-axis direction of the winding core 12 at the same speed with each other, and thereby, the guide member 16 formed of the pair of guiding plates 16a and 16b is moved in the rotation-axis direction of the winding core 12 by an amount corresponding to the outer diameter of the wire rod 11 at every revolution of the winding core 12. In other words, in the wire winding method in this embodiment, the guide members 16 are moved in the rotation-axis direction of the winding core 12 by an amount corresponding to the outer diameter of the wire rod 11 at every revolution of the winding core 12.

As a result, the wire rod 11 to be wound around the winding body 13 is wound so as to be adjacent with, in the rotation-axis direction, and so as to come close contact with the wire rod 11 that has already wound. At this time, in the nozzle-moving mechanism 10h (see FIG. 5), it is preferred that the nozzle 10g be moved in the same direction and at the same speed as the guide members 16.

Especially, in this embodiment, because the guide members 16 are each provided at the winding-start part on the linear wound portion 13a of the winding body 13 having the rectangular cross section, the wire rod 11 is accurately guided to the winding-start position on the linear wound portion 13a. Thereby, it is possible to achieve the so called regular winding in which the wire rods 11 are wound so as to be aligned at the linear wound portion 13a such that the wire rods 11 are reliably packed side by side with a gap therebetween is reduced.

Figure 11:
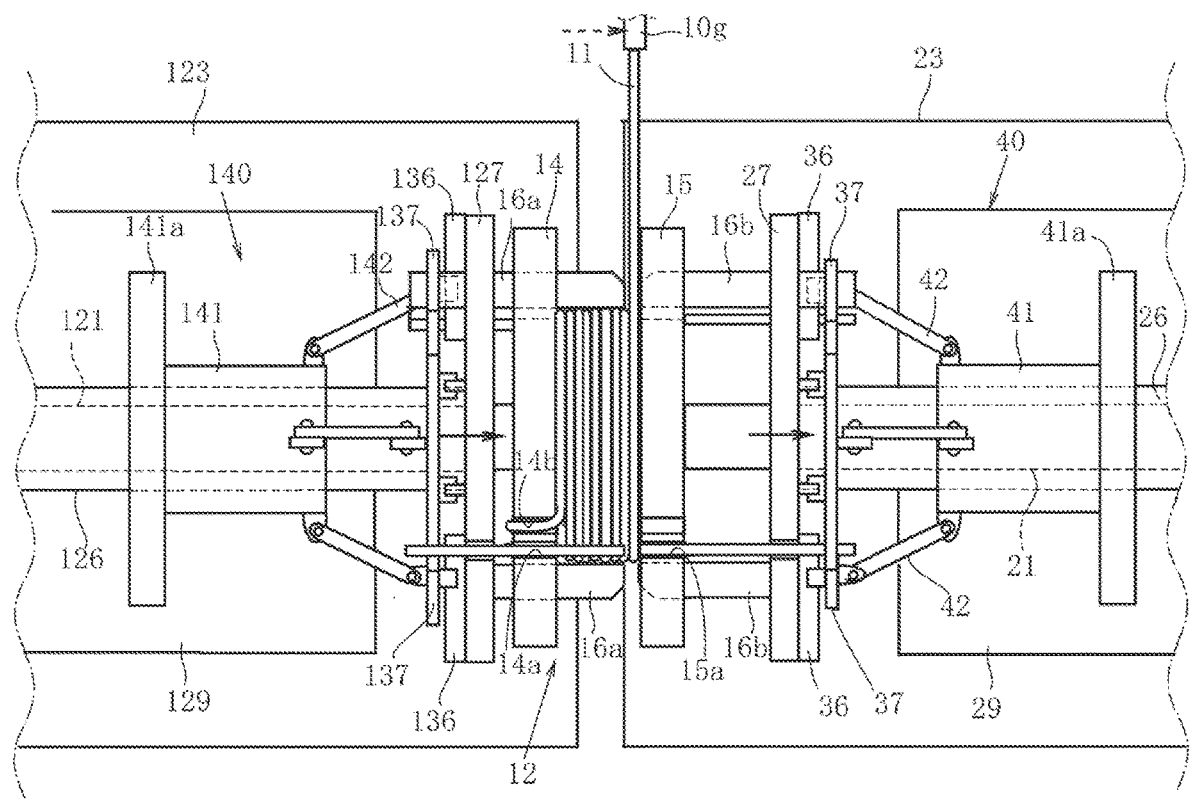
FIG. 11 is a top view corresponding to FIG. 9 showing the winding core in which the wire rod is wound around the winding body between the flanges in a first layer.

As shown in FIG. 11, when the wire rod 11 is wound around the entire winding body 13 between the flanges 14 and 15 so as to be in close contact, the wire winding of a first layer is completed on the winding body 13.

Figure 12:
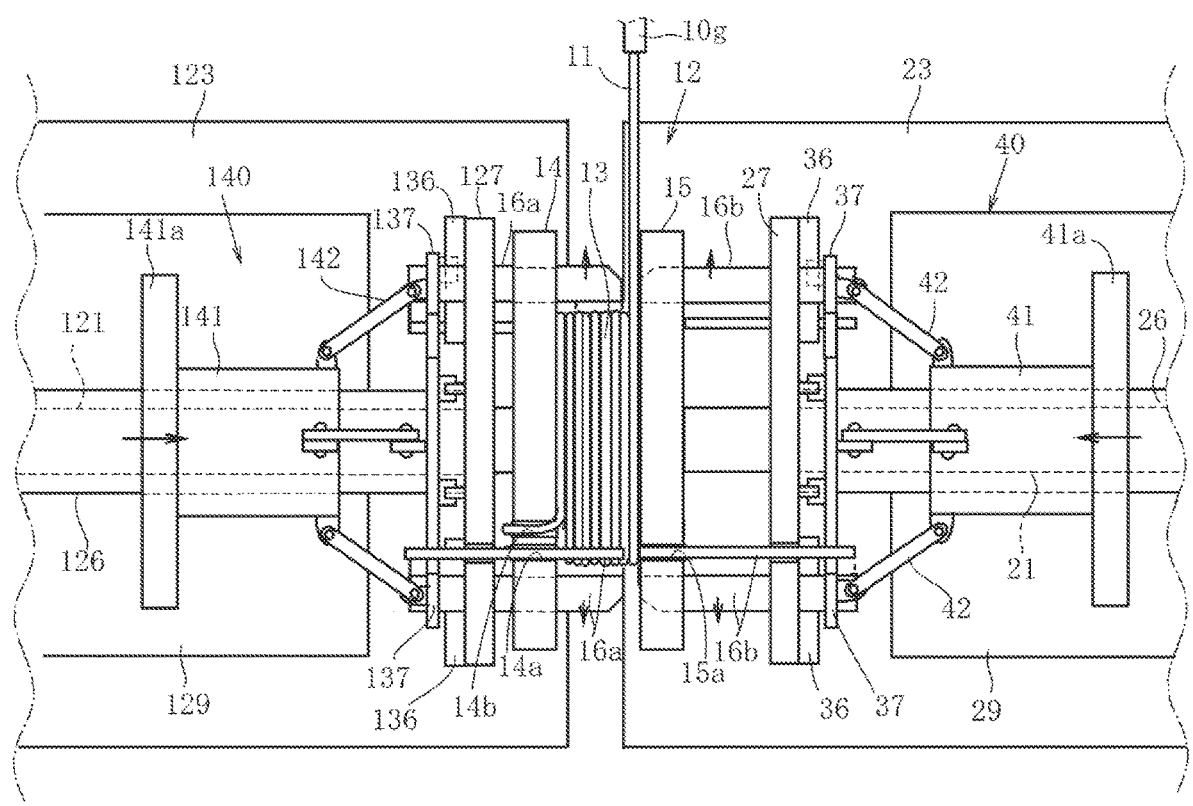
FIG. 12 is a top view corresponding to FIG. 10 showing the winding core at the start of the winding of the further wire rod over the wire rod forming the first layer.

In a case in which the wire rod 11 is to be further wound over the first layer of the wound wire after the wire winding of the first layer is completed, the respective radial-direction moving mechanisms 40 and 140 of the main support rotation mechanism 20 and the sub-support rotation mechanism 120 are controlled in a synchronous manner again. The distance from the winding body 13 to the pairs of guiding plates 16a and 16b is then increased such that the distance from the outer surface of the wire rod 11 forming the first layer that has already been wound on the winding body 13 in the regular pattern to the pairs of guiding plates 16a and 16b is set so as to be slightly larger than the outer diameter of the wire rod 11, as shown in FIG. 12.

Figure 13:
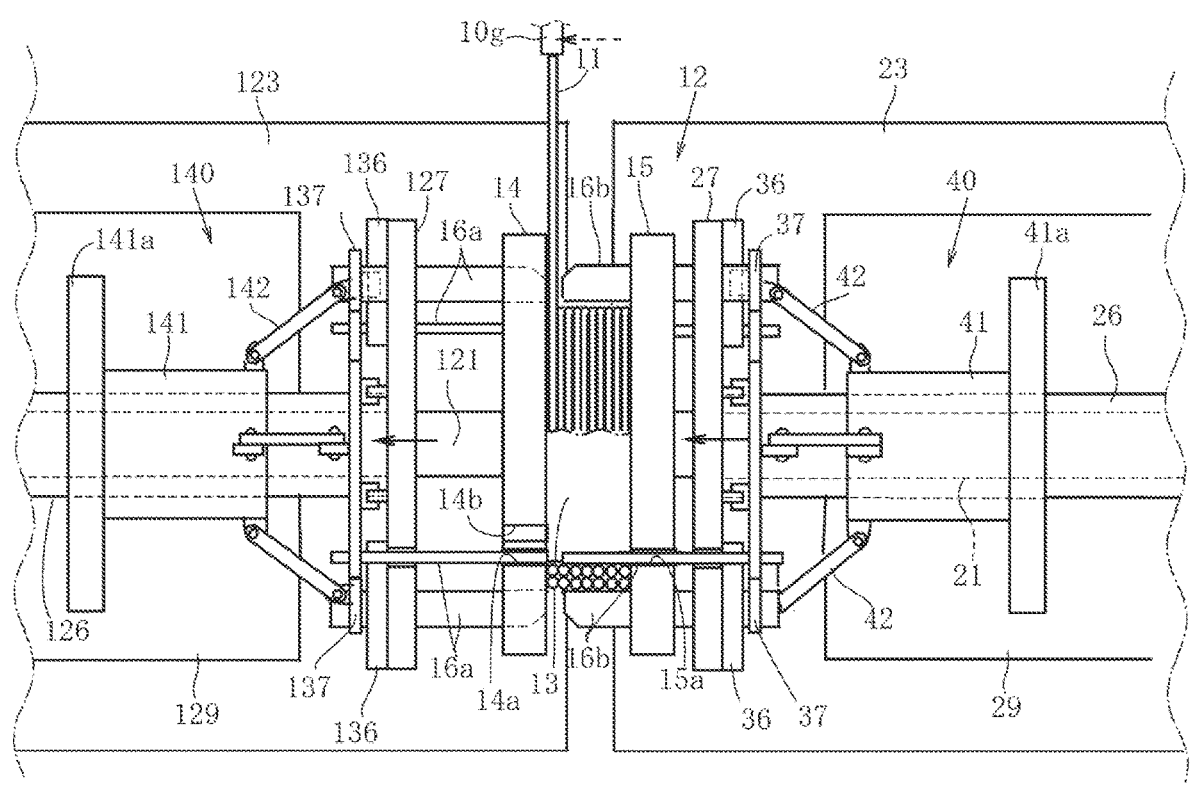
FIG. 13 is a top view corresponding to FIG. 11 showing the winding core around which the wire rod for a second layer is wound over the wire rod forming the first layer.

Thereafter, the winding core 12 is rotated together with the guide members 16, and as shown by solid line arrows in FIG. 13, the pair of guiding plates 16a and 16b are moved in the rotation-axis direction of the winding core 12 at the same speed with each other while maintaining the gap S between the tip-end edges of the pair of guiding plates 16a and 16b. The guide members 16 each formed of the pair of guiding plates 16a and 16b are moved by an amount corresponding to the outer diameter of the wire rod 11 at every revolution of the winding core 12.

Also at this time, in the nozzle-moving mechanism 10h (see FIG. 5), it is preferable that the nozzle 10g be moved in the same direction and at the same speed as the guide members 16. As described above, by further winding the wire rod 11 that has passed between the opposing tip-end edges of the pair of guiding plates 16a and 16b in the regular pattern over the outer surface of the wire rod 11 forming the first layer that has already wound around the winding body 13 in the regular pattern, the wire rod 11 forming a second layer is wound over the wire rod 11 forming the first layer so as to be in close contact with each other in the regular pattern.

Figure 14:
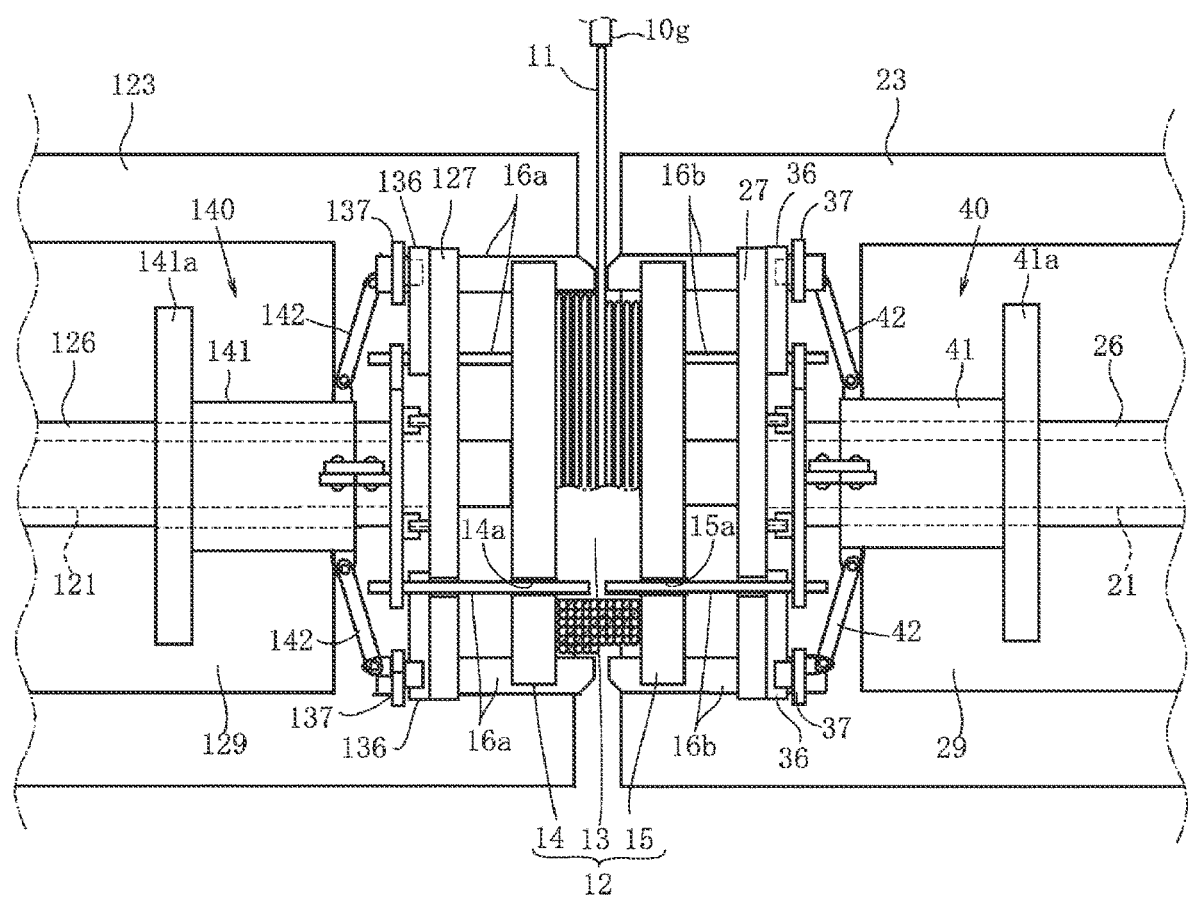
FIG. 14 is a top view corresponding to FIG. 11 showing the winding core in which the wire rod is wound around the winding body in a plurality of layers.

By repeating the above-described procedure, as shown in FIG. 14, it is possible to wind the wire rod 11 around the winding body 13 of the winding core 12 so as to form a plurality of layers.

After the wire rod 11 has been wound around the winding core 12 for a desired number of times, as shown in FIG. 3, the first flange 14 is separated from the one end of the winding body 13 by the flange approach and separation mechanism 50 to remove the wire rod 11 wound around the winding body 13 from the winding body 13.

In the above, in the winding core 12, the slits 14a and 15a are respectively formed in the flanges 14 and 15 provided on both sides of the winding body 13, and the pair of guiding plates 16a and 16b are respectively inserted through the slits 14a and 15a. Therefore, as the pair of guiding plates 16a and 16b are moved in the rotation-axis direction of the winding core 12, as shown in FIGS. 10 to 13, it is possible to place either one of the tip-end edges of the guiding plates 16a and 16b so as to be flush with an inner surface of either one of the flanges 14 and 15.

As described above, by placing either one of the tip-end edges of the guiding plates 16a and 16b so as to be flush with the inner surface of either one of the flanges 14 and 15, the wire rod 11 that has passed between the opposing tip-end edges of the pair of guiding plates 16a and 16b is guided to a part of the winding body 13 beside the flanges 14 and 15 or the wire rod 11 that has already been wound at that part.

Thus, from this state, by performing the wire winding by moving the pairs of guiding plates 16a and 16b in the rotation-axis direction of the winding core 12 by an amount corresponding to the outer diameter of the wire rod 11 at every revolution of the winding core 12, it is possible to wind the wire rod 11 in an aligned manner over the entire winding body 13 between the flanges 14 and 15.

Thus, according to this embodiment, even if a number of winding layers of the wire rod 11 that is wound around the winding core 12 is increased, in other words, even if a number of winding layers, in the rotational radial direction, of the wire rod 11 that is wound around the winding body 13 between the flanges 14 and 15 so as to be closely contacted in the rotation-axis direction is increased, it is possible to wind the wire rod 11 in the regular pattern between the flanges 14 and 15 in a closely contacted manner in the respective layers. By doing so, the wire rod 11 is prevented form being wound in an irregular pattern, and even in a case in which a number of layers is equal to or greater than ten, it is possible to perform the regular winding on all of these layers.

In the above-described embodiment, a description has been given on a case in which the cross section of the winding body 13 of the winding core 12 has the rectangular shape, and the linear wound portions 13a, which are the four flat face portions, are formed around the winding body 13. In other words, a description has been given on a case in which, when the wire rod 11 is wound around the winding body 13, the wire rod 11 extends linearly in the linear wound portions 13a, and so, the winding core 12, in which the linear wound portions 13a at which the wire rod 11 extends linearly are formed at four faces, is used, and the guide members 16 are respectively provided on all of the four faces.

However, the shape of the cross section of the winding body 13 is not limited to the rectangular shape, and for example, it may be possible to employ the winding core 12 in which the cross section of the winding body 13 has a circular shape, an oval shape, and a running-track shape. For example, in the winding core 12 in which the cross section of the winding body 13 has the running-track shape, the linear wound portions 13a are formed at two faces around the winding body 13. Even with the winding core 12 having such a configuration, by providing the guide members 16 at the two faces, it is possible to guide the wire rod 11 to the desired position on the winding body 13 to achieve the regular winding.

In addition, in the above-described embodiment, a description has been given on a case in which the guide members 16 each has the pair of guiding plates 16a and 16b. However, as long as the guide member 16 can be rotated together with the winding core 12 and the wire rod 11 supplied from the drum 10a can be guided to the winding body 13, the configuration of the guide member 16 is not limited to those described above, and other configurations may be employed.

In addition, in the above-described embodiment, a description has been given on a case in which the pairs of guiding plates 16a and 16b are each provided at the winding-start part of the linear wound portion 13a. However, the guide member 16 may be provided at the center of the linear wound portion 13a in the winding direction, a winding-finish part of the linear wound portion 13a, and at both of the winding-start part and the winding-finish part of the linear wound portion 13a. In other words, the guide member 16 may be provided at either one of or both of the winding-start part or/and the winding-finish part of the linear wound portion 13a.

For example, by providing the pair of guiding plates 16a and 16b at both of the winding-start part and the winding-finish part of the linear wound portion 13a, it is possible to linearly guide the wire rod 11 to the linear wound portion 13a and to wind the wire rod 11 in the regular pattern reliably.

In addition, in the above-described embodiment, a description has been given on the winding device 10 provided with the flange approach and separation mechanism 50 that moves the first flange 14, which is detachable from the winding body 13, towards and away from the winding body 13. However, it may be possible to employ a configuration in which the flange approach and separation mechanism 50 is not provided, and an operator manually moves the first flange 14 away from the winding body 13 and removes the coil formed of the wire rod 11 wound around the winding body 13 from the winding body 13.

In addition, in the above-described embodiment, a description has been given on a case in which the winding core 12 is rotated by synchronously controlling the two wire winding motors 24 and 124 provided on the main support rotation mechanism 20 and the sub-support rotation mechanism 120, respectively. However, although not shown in the figure, a single motor may be used to rotate the winding core in which the flanges are provided on both sides of the winding body.

Furthermore, in the above-described embodiment, the radial-direction moving mechanism 40 for moving the guide members 16 in the rotational radial direction of the winding core 12 is provided. However, in a case in which the wire rod 11 is to be wound in a single layer or a small number of layers, because the wire rod 11 may be guided to the desired position on the winding body 13 only by providing the guide member 16 in proximity of the winding body 13 of the winding core 12, it is not necessary to provide the radial-direction moving mechanism 40.

Embodiments of this invention were described above, but the above embodiments are merely examples of applications of this invention, and the technical scope of this invention is not limited to the specific constitutions of the above embodiments.

The invention claimed is:
1. A winding device comprising:
a winding core having a winding body and flanges provided on both sides of the winding body in a rotation-axis direction, the winding core being configured such that a wire rod supplied from a supply source is wound around the winding body being rotated;
a guide member configured to be rotated together with the winding core, the guide member being configured to guide the wire rod to the winding body; and
an axial-direction moving mechanism configured to move the guide member in the rotation-axis direction of the winding core, wherein
the guide member has a pair of guiding plates provided in parallel with a rotation axis of the winding core, the pair of guiding plates respectively having opposing tip-end edges forming a gap through which the wire rod can pass.

2. The winding device according to claim 1, wherein
the axial-direction moving mechanism is configured so as to move the pair of guiding plates in the rotation-axis direction of the winding core at a same speed with each other while maintaining the gap between the pair of guiding plates.

3. The winding device according to claim 2, wherein
the axial-direction moving mechanism is configured to be able to change the gap between the pair of guiding plates.

4. The winding device according to claim 1, further comprising
a radial-direction moving mechanism configured to move the guide member in a radial direction of the winding core.

5. The winding device according to claim 1, wherein
the winding core is provided with a plurality of linear wound portions at which the wire rod wound around the winding body extends linearly, and
the guide member is provided for each of the plurality of linear wound portions so as to face the linear wound portion.

6. The winding device according to claim 5, wherein
the guide member is provided at either one of or both of a winding-start part and a winding-finish part of the linear wound portion.

7. The winding device according to claim 1, further comprising
a flange approach and separation mechanism configured to move one of the flanges towards and away from the winding body, the flanges being provided on the winding body in a detachable manner.

8. A wire winding method for winding a wire rod around a winding body by rotating a winding core in which flanges are provided on both sides of the winding body in a rotation-axis direction, the wire winding method comprising:
a step of guiding the wire rod supplied from a supply source to the winding body by a pair of guiding plates provided in parallel with a rotation axis of the winding core, the pair of guiding plates respectively having opposing tip-end edges forming a gap through which the wire rod can pass, and
a step of winding the wire rod guided by the pair of guiding plates around the winding body by rotating the pair of guiding plates together with the winding core.

9. A wire winding method according to claim 8, wherein
the pair of guiding plates are moved in the rotation-axis direction of the winding core by an amount corresponding to an outer diameter of the wire rod at every revolution of the winding core.

* * * * *